G. A. MEIER AND C. J. WICHER.
COMBINED CAKE AND FILLER FEEDER.
APPLICATION FILED MAY 5, 1920.
1,382,209.
Patented June 21, 1921.
2 SHEETS—SHEET 1.
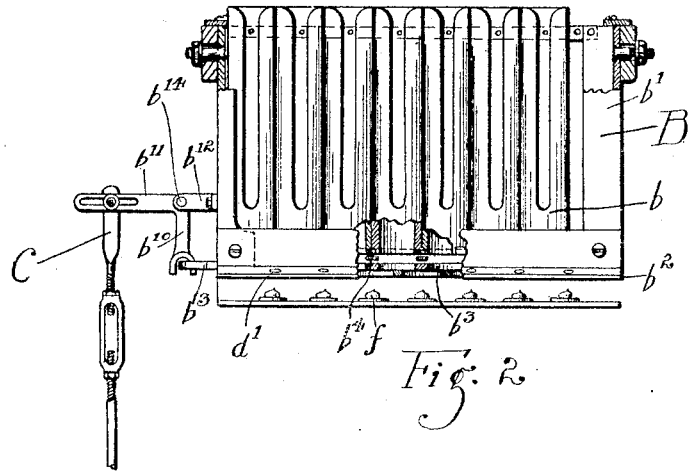
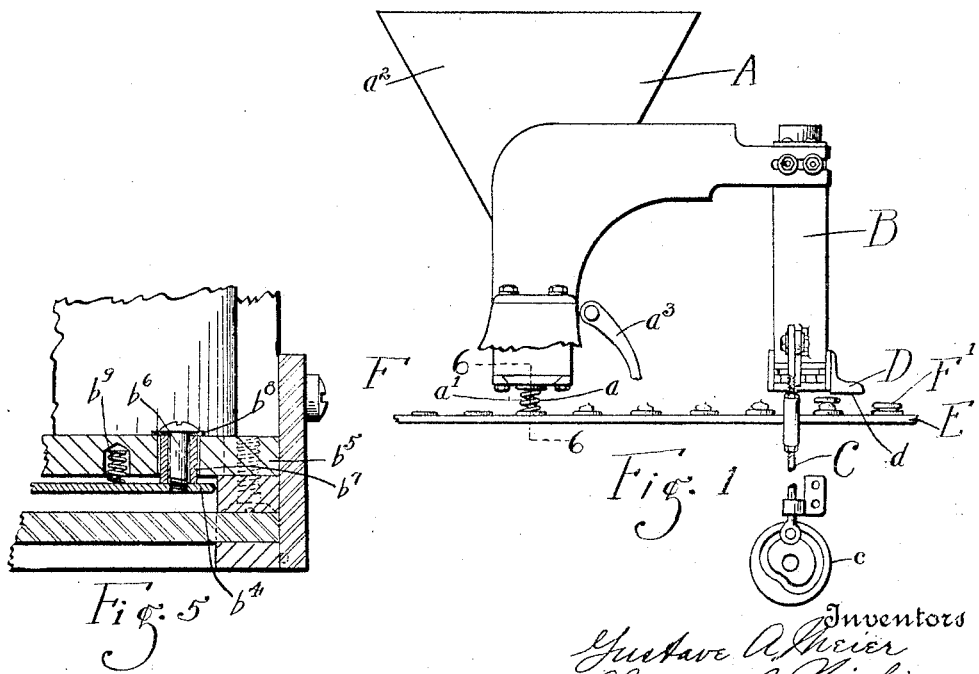

G. A. MEIER AND C. J. WICHER.
COMBINED CAKE AND FILLER FEEDER.
APPLICATION FILED MAY 5, 1920.
1,382,209. Patented June 21, 1921.
2 SHEETS—SHEET 2.
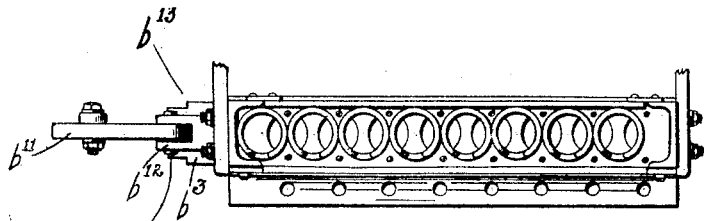
Fig. 3
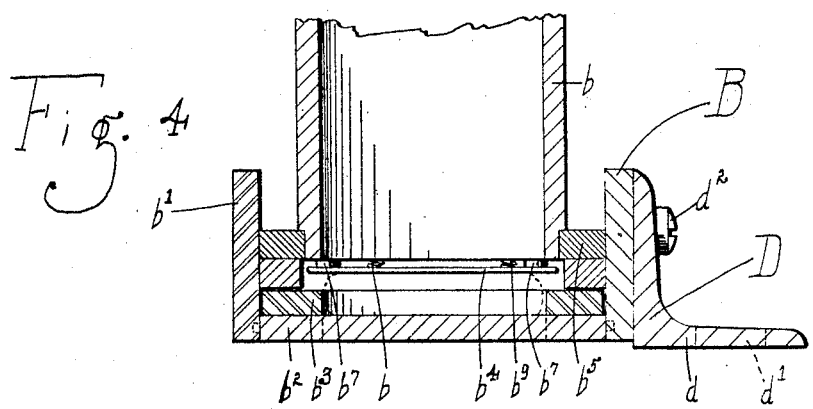
Fig. 4
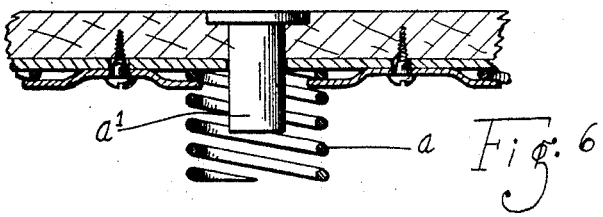
Fig. 6
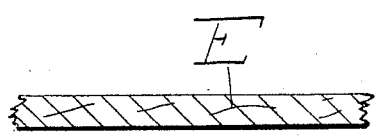
Inventors
Gustave A. Meier
Claude J. Wicher
By Walter F. Murray
Attorney

UNITED STATES PATENT OFFICE.

GUSTAVE A. MEIER, OF NORWOOD, AND CLAUDE J. WICHER, OF CINCINNATI, OHIO, ASSIGNORS TO THE GEORGE H. STRIETMANN'S SONS CO., OF CINCINNATI, OHIO, A CORPORATION OF OHIO.

COMBINED CAKE AND FILLER FEEDER.

1,382,209.  Specification of Letters Patent.  Patented June 21, 1921.

Application filed May 5, 1920. Serial No. 379,152.

*To all whom it may concern:*

Be it known that we, GUSTAVE A. MEIER and CLAUDE J. WICHER, citizens of the United States of America, and residents of Norwood and Cincinnati, in the county of Hamilton and State of Ohio, have invented a new and useful Improvement in Combined Cake and Filler Feeders, of which the following is a specification.

An object of our invention is to provide means for placing a filler on cakes or crackers and the placing of a second cake over the filler.

Another object of our invention is to provide a mechanism that will compress the filler between the cakes.

Another object is a means for preventing the filler on the cakes from coming into contact with the mechanism.

These and other objects are attained by means described herein and disclosed in the accompanying drawing, in which:

Figure 1 is a side elevation, parts being broken away of a filling feeder and a cake feeder forming details of our invention.

Fig. 2 is a front elevation, parts being shown in section, of the cake feeder forming a detail of our invention.

Fig. 3 is a plan view of the device shown in Fig. 2.

Fig. 4 is an enlarged sectional view of the lower end of one of the tubes forming a detail of our invention.

Fig. 5 is an enlarged sectional view showing in detail the cross bar forming a detail of our invention.

Fig. 6 is an enlarged sectional view on line 6—6 of Fig. 1.

Our invention comprises a mechanism A for depositing a filler upon a series of cakes that are moved beneath such mechanism. A cake feeder B comprising a series of tubes $b$, beneath which the cake and filler then pass, is adapted to place an upper cake upon the filler. The device then compresses the filler between the upper and lower cakes, forming a so-called sandwich cake.

The filler feeding mechanism A is of the type commonly used for this purpose. A spiral spring $a$ is attached to the device A and is coiled about the discharge nozzle $a'$ through which the filler is forced out of the hopper $a^2$. This spring prevents the cake adhering to the under surface of the discharge nozzle should a heavy, sticky filler be used. The discharging of the filler upon the cake is controlled by the cam operated lever $a^3$, as is customary in machines for this purpose. The cakes then are carried by the conveyer E to a place beneath the series of tubes $b$ attached to the cake feeder B.

The cake feeder B comprises a frame $b'$ supporting a series of vertical tubes $b$. Slidably mounted between the perforated fixed bottom plate $b^2$ attached to the frame $b'$, and the perforated fixed support $b^5$ to which the lower ends of the tubes are attached, is a perforated reciprocating plate $b^3$. The diameter of the perforations in the reciprocating plate and in the bottom plate is approximately the same as the inside diameter of the tubes. The perforations in the bottom plate $b^2$ are in staggered relation to the openings in the tubes. The plate $b^3$ is adapted to be reciprocated between the support $b^5$ and the bottom plate so that the perforations in the reciprocating plate may be moved into registration with either the tubes or the perforations in the bottom plate. A cross bar $b^4$ is suspended from the support $b^5$, transversely to the support and directly beneath the place of contact of the adjacent tubes. A screw $b^6$ about which a collar $b^7$ is mounted and about the head of which is secured a washer $b^8$ is screwed into the cross bar. The spring $b^9$ normally holds the cross bar from engagement with support $b^5$. The perforated lug $b^{13}$, formed on reciprocating plate $b^3$, extends through one side of the frame $b'$ and is engaged by the arm $b^{10}$ of the bell crank lever $b^{11}$ pivotally mounted upon the lug $b^{12}$ attached to the side of feeder B. The bell crank $b^{11}$ is adapted to be turned upon the pivot $b^{14}$ by means of a shaft C operated by means of the cam $c$.

The pressure plate D attached to the front of the feeder B, has a perforated horizontal arm $d$. The perforations $d'$ are so spaced upon the horizontal arm, that they will be immediately above the cakes that pass along the conveyer E. The perforations $d'$ are made of such diameter, that should the feeder B fail to place a cake over the filler, the filler will enter the hole and will not engage the pressure plate; and that the under surface of the plate D, adjoining the perforations will resist an upper cake's movement when the conveyer moves the cakes and filler upward.

In operating our device the cakes F are spaced upon the conveyer E. The various operating mechanisms are so controlled that a cake will be located below each discharge nozzle at a given time. The conveyer E then moves upward and brings the cake into engagement with the spring $a$ and compresses the spring until the cake is immediately below the nozzle $a'$. A quantity of the filler $f$ is then deposited upon the cake. The conveyer E then moves downward, the spring $a$ holding the cake upon the conveyer and pushing the cake away from the nozzle and preventing the cake adhering thereto. The conveyer E then moves the cakes, step by step, until they reach a place immediately subjacent to the perforations in the bottom plate $b^2$. The cakes F' that have been placed in the tubes $b$, feed, one at a time, into individual perforations in the reciprocating plate $b^3$. The cam operated shaft C then operates the bell crank $b^{10}$ which in turn moves plate $b^3$ to such a place where the perforations in the plate $b^3$ register with the perforations in the bottom plate $b^2$. The cross bars $b^4$ prevent more than one cake falling into any perforation in the movable plate $b^3$, but will allow any one cake that may be slightly thicker than the space between the bottom plate $b^2$ and the normal position of the cross bar $b^4$, to be carried by the movable plate $b^3$. When the perforations in the movable plate register with the perforations in the fixed plate $b^2$, the cake F' is immediately above the filler $f$ upon the cake F. The conveyer E is moved upward toward the feeder B, whereupon, the cake F' is evenly placed over the filler $f$. The mechanisms are so timed that the conveyer E has raised the lower cake F and filler $f$ to their highest points at the time when the cake F' is released from the feeder B, by the registration of the perforations in the reciprocating plate $b^3$ with the perforations in the fixed bottom plate $b^2$. The conveyer E then moves downward. The next step of the conveyer places the cakes with the filler between them beneath the pressure plate D. The conveyer then moves upward toward the pressure plate, pressing the cakes together, thereby compressing the filler. The cakes, the conveyer and the feeding mechanisms are so spaced and timed that upon one upward movement of the conveyer, the filler feeder, the cake feeder and the pressure plate will each operate upon a transverse row of cakes on the conveyer.

What we claim is:

1. In a cake feeding device the combination of a conveyer adapted to feed a series of rows of cakes, each carrying a deposit of filler, a series of tubes adapted to hold cakes, a fixed bottom plate having perforations in longitudinal alinement with rows of cakes upon the conveyer, means for feeding cakes from the tubes to the perforations in the bottom plate, and a pressure plate mounted adjacent to the bottom plate and having a series of perforations in longitudinal alinement with the rows of cakes and of a diameter substantially equal to that of each deposit.

2. In a cake feeding device the combination of a vertical tube, a perforated horizontal bottom plate below the tube and having its perforation spaced out of vertical alinement with the opening in the tube, a perforated reciprocating plate adapted to move cakes from the tube to the perforation in the bottom plate, and yieldable means limiting the number of cakes carried by the reciprocating plate.

3. In a cake feeding device the combination of a vertical tube, a perforated horizontal bottom plate below the tube and having its perforation spaced out of vertical alinement with the opening in the tube, a perforated reciprocating plate between the tube and the bottom plate, means to move the reciprocating plate so that the perforation therein will alternately register with the tube and the perforation in the bottom plate, and yieldable means limiting the number of cakes carried by the reciprocating plate.

4. In a cake feeding device the combination with a perforated horizontally reciprocating cake conveyer of a transverse bar suspended above the conveyer and transversely to the reciprocation thereof and adapted to yieldingly resist the moving of the cakes by the conveyer.

5. In a cake feeding device having a perforated fixed support the combination with a perforated horizontally reciprocating cake conveyer below the support of a transverse horizontal bar, means to loosely suspend the bar from the support and means to yieldingly repel the bar from the support.

6. A pressure plate for use with a conveyer adapted to feed a series of rows of sandwich cakes each comprising a lower and an upper cake and having a filler between them, said pressure plate having a series of perforations in longitudinal alinement with the rows of cakes and of a diameter substantially equal to that of each deposit of filler upon the lower cake.

7. In a cake feeding device having a perforated fixed support the combination with a perforated horizontally reciprocating cake conveyer below the support, of a transverse horizontal bar, screws extending from the transverse bar and limiting the movement of the bar from the support, and springs mounted between the support and the bar.

In witness whereof, we have hereunto subscribed our names this 30th day of April, 1920.

GUSTAVE A. MEIER.
CLAUDE J. WICHER.